US011215519B2

(12) United States Patent
Yebka et al.

(10) Patent No.: US 11,215,519 B2
(45) Date of Patent: Jan. 4, 2022

(54) DEVICE COMPONENT SWELLING DETECTION

(71) Applicant: Lenovo (Singapore) Pte. Ltd., Singapore (SG)

(72) Inventors: Bouziane Yebka, Apex, NC (US); Tin-Lup Wong, Chapel Hill, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/795,956

(22) Filed: Feb. 20, 2020

(65) Prior Publication Data

US 2021/0262883 A1 Aug. 26, 2021

(51) Int. Cl.
*G08B 21/00* (2006.01)
*G01L 9/00* (2006.01)
*H01M 10/48* (2006.01)

(52) U.S. Cl.
CPC ......... *G01L 9/0055* (2013.01); *H01M 10/482* (2013.01); *H01M 2200/20* (2013.01)

(58) Field of Classification Search
CPC .............. G01L 9/0055; H01M 10/482; H01M 2200/20
USPC .......................................................... 340/635
See application file for complete search history.

(56) References Cited

U.S. PATENT DOCUMENTS

| | | | |
|---|---|---|---|
| 6,271,644 B1* | 8/2001 | Okada | H01M 50/213 320/112 |
| 8,758,920 B2* | 6/2014 | Otsuki | H01M 50/209 429/97 |
| 10,230,136 B2* | 3/2019 | Fukuda | G01L 9/14 |
| 10,355,319 B1* | 7/2019 | Lim | H01M 10/4257 |
| 10,476,068 B2* | 11/2019 | Chung | H01M 50/20 |
| 2005/0092329 A1* | 5/2005 | Sta-Maria | A61M 16/06 128/207.18 |
| 2006/0181517 A1* | 8/2006 | Zadesky | G06F 3/045 345/173 |
| 2007/0054157 A1* | 3/2007 | Ryu | H01M 10/42 429/7 |
| 2012/0208054 A1* | 8/2012 | Shirasawa | H01M 10/0468 429/90 |
| 2014/0002269 A1* | 1/2014 | Zhou | H01M 10/482 340/636.11 |
| 2014/0042961 A1* | 2/2014 | Lan | H01M 10/425 320/107 |
| 2015/0171410 A1* | 6/2015 | Shin | H01M 50/578 429/61 |
| 2016/0064780 A1* | 3/2016 | Jarvis | H01M 10/48 429/50 |
| 2017/0077561 A1* | 3/2017 | Fukuda | H02J 7/00 |
| 2017/0108326 A1* | 4/2017 | Hopkins | H01M 10/48 |
| 2017/0288283 A1* | 10/2017 | Fukuda | H01M 10/48 |
| 2017/0309973 A1* | 10/2017 | Haug | H01M 10/488 |
| 2017/0331157 A1* | 11/2017 | Newman | H01M 50/20 |

(Continued)

*Primary Examiner* — Zhen Y Wu
(74) *Attorney, Agent, or Firm* — Ference & Associates LLC (57) ABSTRACT

One embodiment provides an electronic device, including: a device component; a pressure sensor integrated into a surface lining of the device component; and at least one adaptive gap-filling component situated between the surface lining of the device component and a wall of the electronic device that at least partially surrounds the device component. Other aspects are described and claimed.

11 Claims, 8 Drawing Sheets

(56) References Cited

U.S. PATENT DOCUMENTS

| | | | |
|---|---|---|---|
| 2018/0226698 A1* | 8/2018 | Lin | H01M 10/0525 |
| 2018/0261824 A1* | 9/2018 | Ju | H02J 7/0047 |
| 2019/0227125 A1* | 7/2019 | Fukuda | H02J 7/0021 |
| 2019/0249979 A1* | 8/2019 | Minakata | H01M 50/20 |
| 2019/0363392 A1* | 11/2019 | Kim | H01M 10/0481 |
| 2020/0168959 A1* | 5/2020 | Hettrich | G01R 31/392 |
| 2020/0185166 A1* | 6/2020 | Doro | H01H 13/14 |
| 2020/0203783 A1* | 6/2020 | Ringuette | G01R 31/392 |
| 2020/0227793 A1* | 7/2020 | Kim | H01M 50/147 |
| 2020/0239291 A1* | 7/2020 | Lohmann | B66F 9/0759 |
| 2020/0358440 A1* | 11/2020 | Morrison | H01F 1/147 |

* cited by examiner

DEVICE COMPONENT SWELLING DETECTION

BACKGROUND

Mobile electronic devices ("devices"), for examples smart phones, tablets, laptop computers, and the like, must be powered in some way. In situations where the device is not attached to a connected power source such as an AC line, a charger, a power bank, etc., the device must draw energy from one or more battery packs integrated into the device. Through battery discharge, the device may draw the energy needed from the battery pack to power the device and/or to operate one or more applications on the device.

BRIEF SUMMARY

In summary, one aspect provides an electronic device, comprising: a device component; a pressure sensor integrated into a surface lining of the device component; and at least one adaptive gap-filling component situated between the surface lining of the device component and a wall of the electronic device that at least partially surrounds the device component.

Another aspect provides a method, comprising: detecting, using a pressure sensor integrated into a surface lining of a device component housed within an electronic device, a swelling event associated with the device component; wherein the detecting comprises utilizing at least one adaptive gap-filling component, wherein the at least one gap-filling component is situated between the surface lining of the device component and a wall of the electronic device that at least partially surrounds the device component.

A further aspect provides a method, comprising: auto-zeroing a pressure sensor integrated into a surface lining of a device component housed within an electronic device, wherein the auto-zeroing comprises: introducing at least one adaptive gap-filling component between the surface lining of the device component and a wall of the electronic device that at least partially surrounds the device component.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1(A-B) illustrates a prior art configuration of a device component having a pressure sensor.

FIG. 3(A-B) provides an example representation of a gap-filling component according to an embodiment and its effects on detected device component swelling.

FIG. 4(A-C) provides an illustration of an adaptive gap-filling component according to an embodiment.

FIG. 5(A-C) provides an illustration of an adaptive gap-filling component according to an embodiment.

FIG. 6(A-D) provides an illustration of an adaptive gap-filling component according to an embodiment.

FIG. 7(A-C) provides an illustration of an adaptive gap-filling component according to an embodiment.

FIG. 8(A-B) provides an illustration of an adaptive gap-filling component according to an embodiment.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Situations arise where a battery pack ("battery") swells. In these instances, a number of negative effects may occur. For example, the battery may stop working, the battery may bulge and/or bubble, the swelling may damage the device housing the battery, and, in extreme situations, the battery may explode, potentially harming a user. A variety of different factors may contribute to battery swelling such as, inter alia, aging during storage, time at full charge voltage, exposure to high temperature (e.g., when a device is left in the sun on a hot day, etc.), cycling count, manufacturing defects, poor cell quality and design, mechanical damage to electrodes due to mishandling, deep discharge of cells, and the like.

Figure 1A:
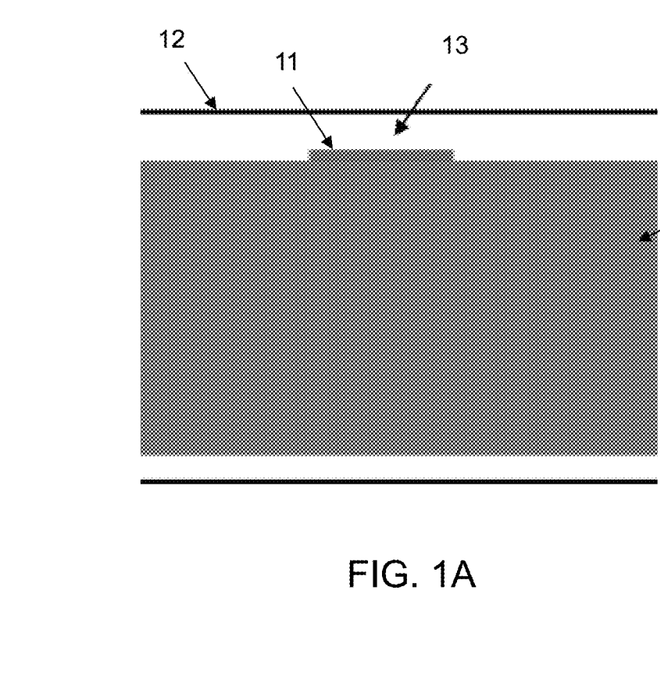
Figure 1B:
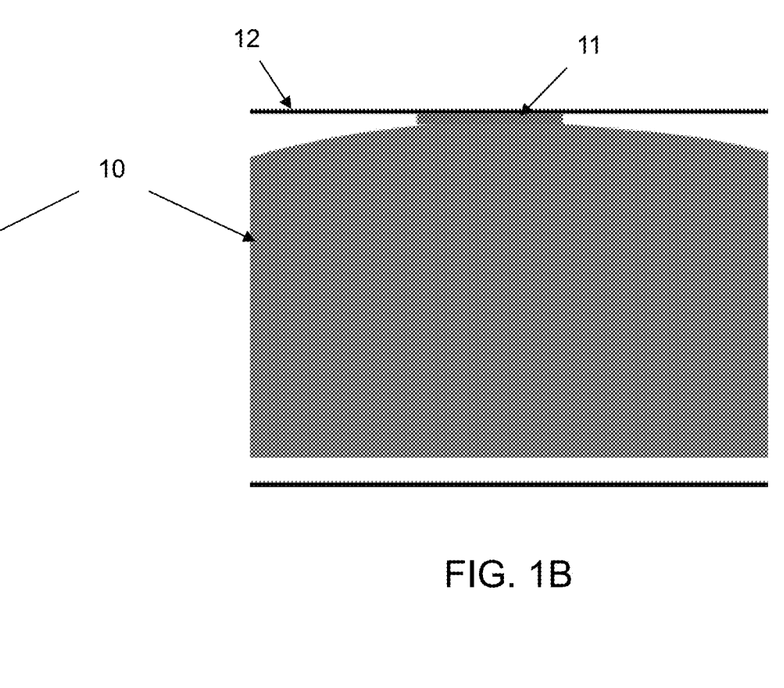

Due to the foregoing, the detection of battery swelling is important for ensuring that the device housing the battery is not damaged and/or for ensuring that users are not harmed when interacting with their device. Accordingly, pressure sensors currently exist that are integral to the battery and can detect when swelling occurs. For example, with reference to FIG. 1A, a battery 10 is illustrated that contains a pressure sensor 11. When the battery 10 swells, as illustrated in FIG. 1B, the sensor 11 may come into contact with a system lining 12, at which point the sensor 11 may record data associated with the detected swelling event. This information may thereafter be communicated to the user (e.g., in an emergency notification, etc.) and/or may be utilized by the device (e.g., to perform a dynamic shut down, etc.).

Issues exist, however, with conventional implementations of battery-based pressure sensors. Specifically, the current configurations do not account for the presence of a gap 13, as shown in FIG. 1A, between the battery 11 and the system lining 12. The presence of this gap 13 results in undetected swelling by the pressure sensor 11. More particularly, in order for the pressure sensor 11 to come into contact with the system lining 12, the battery 10 must swell by a certain degree. Consequently, because data related to the swelling only begins to be recorded when the pressure sensor 11 comes into contact with the system lining 12, any swelling by the battery 10 before this point goes undetected.

Figure 2:
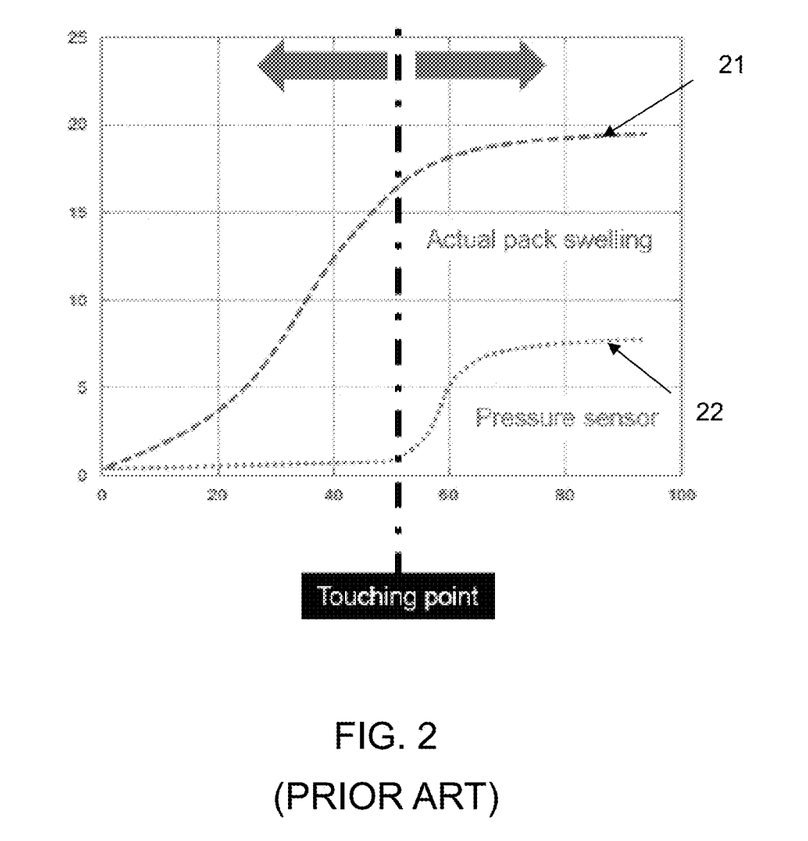
FIG. 2 provides a graph of actual device component swelling versus detected device component swelling.

The effects of the aforementioned gap are further visualized by reference to FIG. 2. Specifically, the graph in FIG. 2 illustrates the difference between how much the battery has actually swelled 21 versus what the pressure sensor detects 22 at the point at which the battery comes into contact with the system lining. In the graph, it can be seen that the battery has actually swelled by about 17% at the touching point whereas the sensor only records that minimal swelling has occurred. The difference between the actual 21 versus detected 22 swelling percentage may be at least partially dependent upon the size of the gap (i.e., the greater the gap size the greater difference between the actual versus detected swelling percentage).

Accordingly, an embodiment provides a method and configuration for more accurately detecting battery swelling. In an embodiment, a swelling event associated with a battery may be detected by a pressure sensor integrated into a surface lining of the battery. Detection of the swelling event may be further facilitated by the presence of at least one adaptive gap-filling component. The adaptive gap-filling component may take one of a variety of different forms and may be situated between the surface lining of the battery and a wall of the electronic device that at least partially surrounds the battery. As the battery swells and expands into the adaptive gap-filling component, the component may dynamically adjust its length in response to the force of the swelling. The presence of such a component may therefore help "zero" the pressure sensor and allow it to record more accurate swelling readings.

The illustrated example embodiments will be best understood by reference to the figures. The following description is intended only by way of example, and simply illustrates certain example embodiments.

Figure 3A:
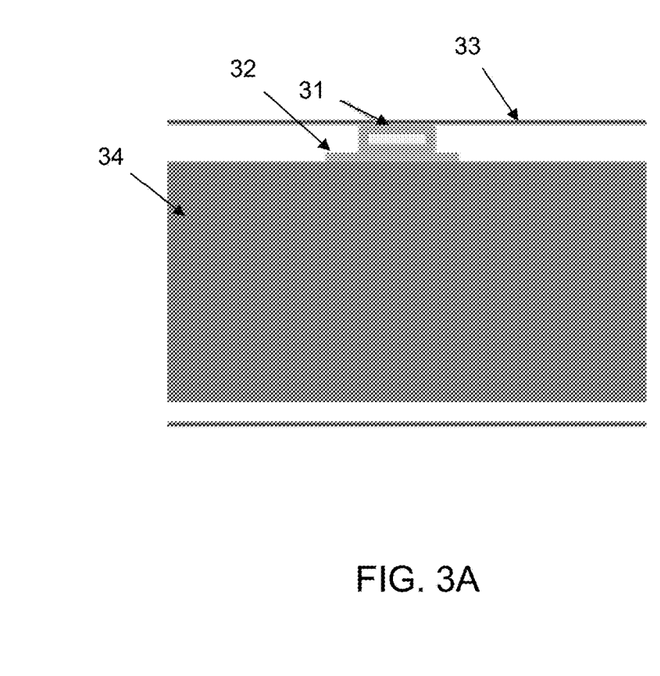
Figure 3B:
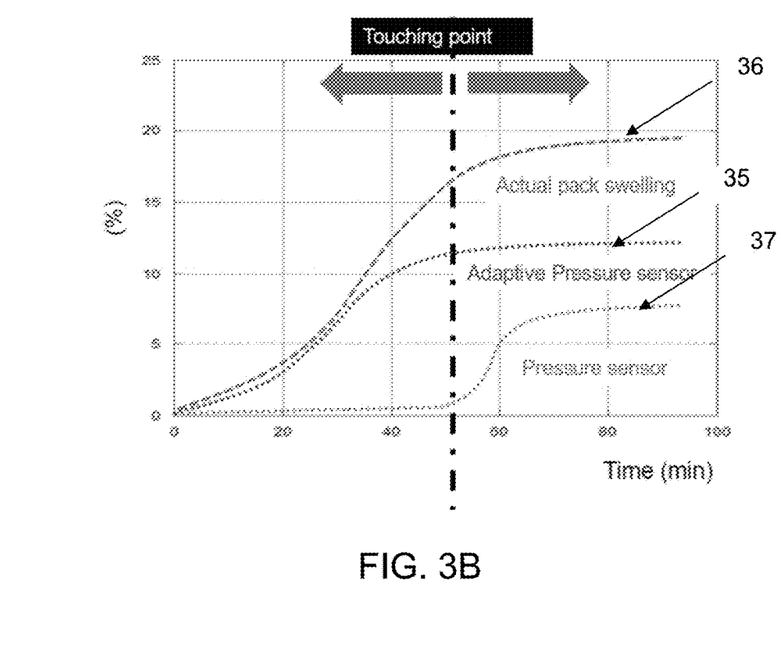

Referring now to FIG. 3(A-B), the effects that an adaptive gap-filling component has on the accuracy of swelling detection is illustrated. With respect to FIG. 3A, a generic representation of an adaptive gap-filling component 31 placed between a pressure sensor 32 and a wall 33 of the system/electronic device is provided. In an embodiment, the pressure sensor 32 may be integrated into a surface lining of a battery 34. The battery 34 may be virtually any type of battery that is susceptible to swelling and/or bulging (e.g., a lithium-ion battery pack, etc.). In an embodiment, the electronic device may be virtually any electronic device that is capable of supporting and/or drawing power from a swelling-susceptible battery (e.g., a smart phone, tablet, laptop, etc.).

As can be seen from the figure, the adaptive gap-filling component 31 may serve to bridge the gap that is present in conventional configurations (i.e., as shown in FIG. 1A). In an embodiment, the adaptive gap-filling component may be specially designed to fit an exact gap distance (e.g., for a particular battery pack/electronic device pair, etc.). Additionally or alternatively, the adaptive-gap filling component may be designed to be dynamic to fit a variety of different gap distances that may be present in differing battery/electronic device pairs (e.g., from gap sizes ranging from 0.5 mm-5 mm, etc.).

In either of the component designs described in the previous paragraph, a length of the adaptive gap-filling component may be adjustable (e.g., similar to a spring, etc.). The flexible nature of this component may ensure that it is lengthy enough to appropriately fill the gap (i.e., by expanding in length to fit the dimensions of the gap). Additionally, manufacturers may take advantage of this flexibility during the component installation. For example, in this case of a spring-like component, a length of the component may be originally decreased, e.g., by applying a force to one or both ends of the component, when the component is placed between the pressure sensor and a wall surrounding the battery. Once inserted, the applied forces may be removed and the component may naturally expand to fit the dimensions of the gap. Additionally or alternatively, the inserted components may thereafter substantially solidify in place and may thereby allow the pressure sensor to better detect early swelling.

The presence of this component may help to "auto-zero" the pressure sensor, thereby allowing it to more accurately track the actual swelling experienced by the battery. More particularly, when swelling occurs, the pressure sensor is forced against the gap-filling component, thereby allowing the pressure sensor to receive an indication of pressure much earlier than what would have been detected in conventional designs (i.e., due to the pressure sensor expanding into an empty gap).

The improvements in swelling detection resulting from utilization of the adaptive gap-filling component may become more apparent upon an examination of the graph provided in FIG. 3B. As can be seen from the graph, the adaptive pressure sensor (i.e., the pressure sensor utilized in combination with the adaptive gap-filling component) produces a graph plot 35 that is much closer to a graph plot 36 produced by the actual swelling of the battery than a graph plot 37 produced by conventional techniques known in the art. More particularly, during the early stages of swelling, the adaptive pressure sensor substantially exactly tracks the process of actual swelling. As swelling progresses and the battery lining approaches the touching point (i.e., the system/device wall surrounding the battery), the accuracy of the adaptive pressure sensor tapers off because, inter alia, a length of the gap-filling component can only contract so far, thereby preventing the pressure sensor from expanding naturally with the battery to the touching point and beyond.

Early stage swelling detection accuracy, achieved by the embodiments described herein, is very important to mitigate damage caused to the device and/or a user of the device. In certain embodiments, the pressure sensor may transmit (e.g., wirelessly, etc.) the swelling data to one or more processors of the device it is housed in, which may thereafter utilize that data to perform one or more downstream functions. For example, upon receipt of the swelling data, an embodiment may provide an alert notification to a user (e.g., that battery swelling is occurring, etc.). Additionally or alternatively, an embodiment may keep track of and record the data in an accessible storage database (e.g., stored locally on the device, etc.). Additionally or alternatively, an embodiment may dynamically initiate a power-off function (e.g., responsive to detecting that a rate of or a degree of swelling has exceeded a predetermined threshold, etc.).

The subsequent figures illustrate various types of potential gap-filling components that may be consistent with the embodiment described herein. It is important to note that the types of gap-filling components that are illustrated and described herein are not limiting and other types of gap-filling components, not explicitly illustrated and described here, may also be utilized.

Figure 4A:
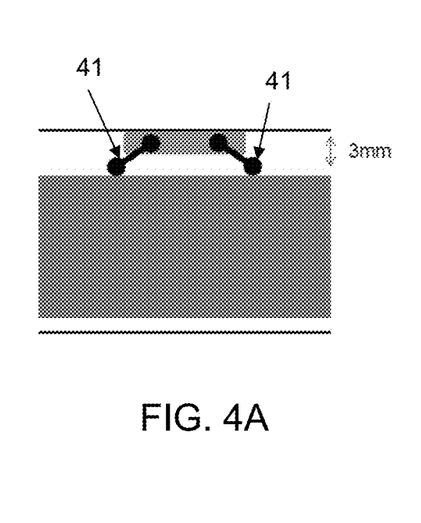
Figure 4B:
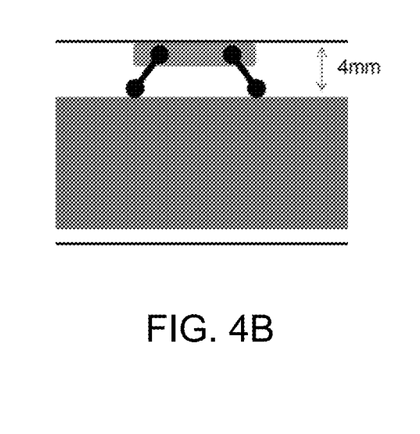
Figure 4C:
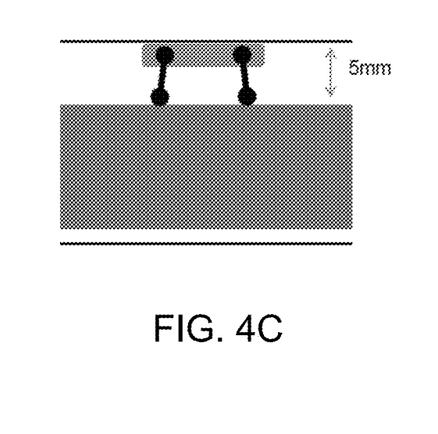

FIG. 4(A-C) illustrates an embodiment in which the adaptive gap-filling component corresponds to a spring piezoresistive sensor. The sensor of this embodiment may contain at least two arms 41, as annotated in FIG. 4A, that are able to detect mechanical strain (i.e., produced from the swelling of the battery). These arms may be adjustable (e.g., as shown from FIG. 4A to FIG. 4C) to accommodate the size of a gap. Additionally, as swelling occurs, the arms may correspondingly flatten to accommodate for the swelling of the battery.

Figure 5A:
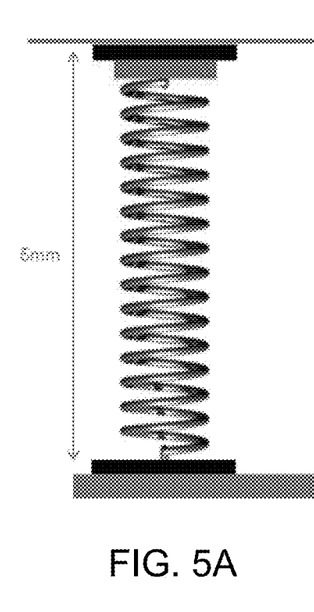
Figure 5B:
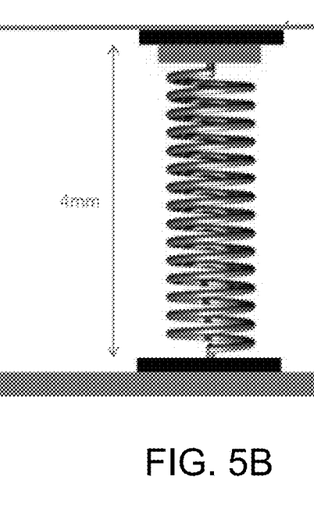
Figure 5C:
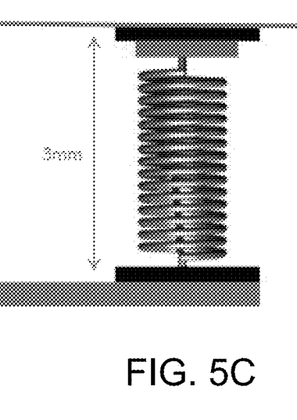
Figure 6A:
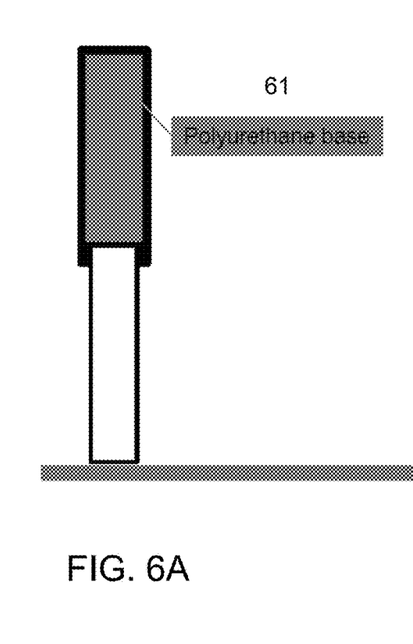
Figure 6B:
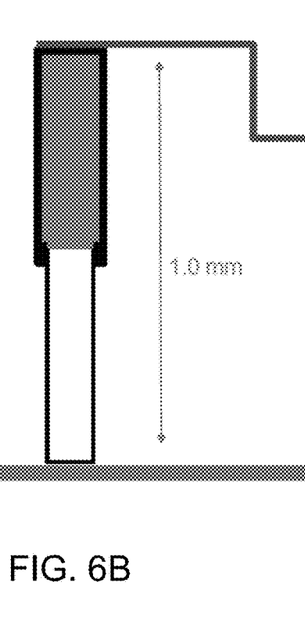
Figure 6C:
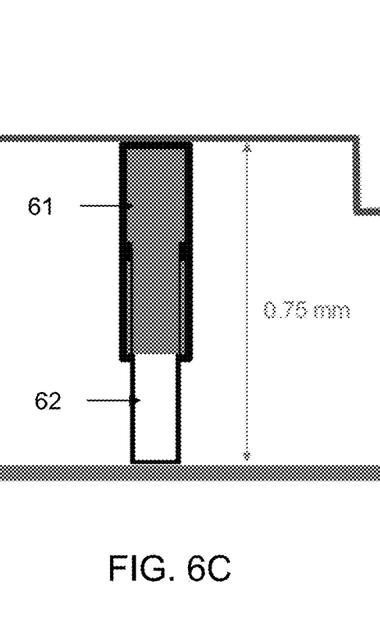
Figure 6D:
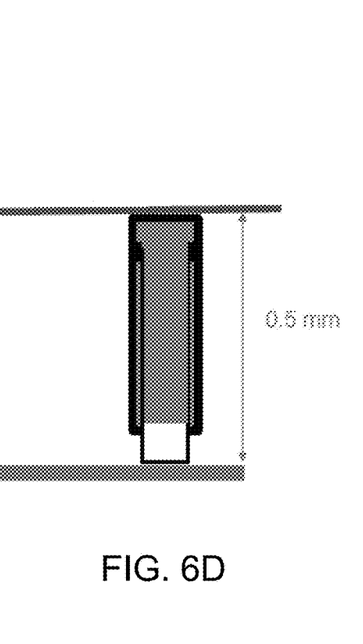

FIG. 5(A-C) illustrates a similar concept wherein the adaptive gap-filling component corresponds to a simple spring configuration. As in FIG. 4(A-C), the spring configuration may adjust in length responsive to increasing mechanical strain and may be manipulated to fit a number of different gap sizes. In an embodiment, the spring may be composed of a polymer base (e.g., similar to epoxy, etc.). The composition of this embodiment allows the spring to be adjustable in length during installation (i.e., to expand/fit to a gap of a particular size) but may thereafter harden once it has settled into the gap. This "delayed thermosetting" property of the spring may allow the pressure sensor to better detect swelling (i.e., by contacting the solidified gap-filling component during battery swelling).

FIG. 6(A-D) illustrates an embodiment in which the adaptive gap-filling component corresponds to an adaptive air-dry polymer spring configuration. Referring to FIG. 6A, a non-limiting example representation of the air-dry polymer component in its naturally expanded state is illustrated. This component may contain a polyurethane base 61 that may consist of at least five component materials (i.e., polyols, sulfactants, catalyst, blowing agents, and fire retardents). During installation, the component may be contracted to fit a needed gap size (as illustrated in FIGS. 6(B-D)) at which point a bottom portion 62 of the component may penetrate the polyurethane base, as shown in FIG. 6C. This penetration initiates a chemical reaction that may allow the component to solidify to robustly fit to the gap space once component movement (i.e., expansion and/or contraction) has stopped.

Figure 7A:
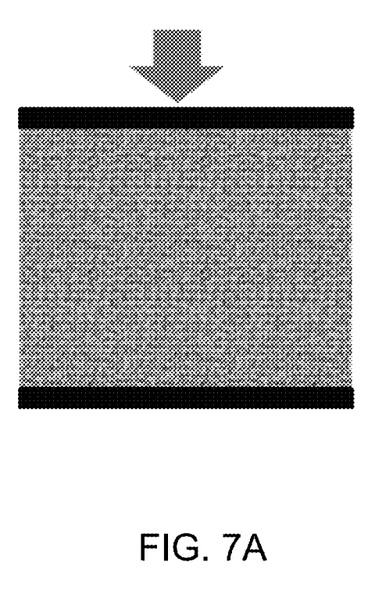
Figure 7B:
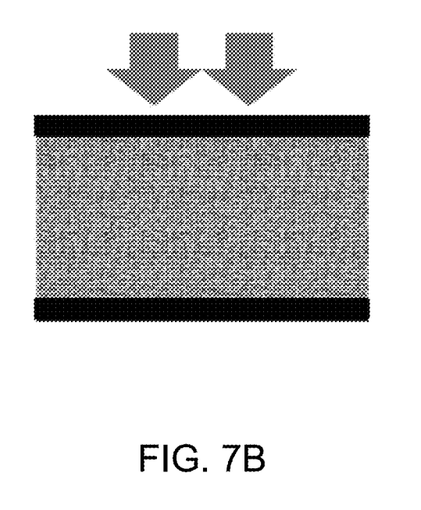
Figure 7C:
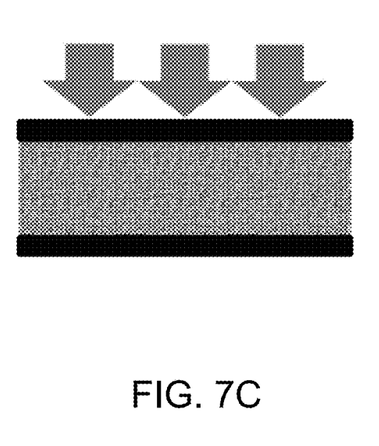

FIG. 7(A-C) illustrates an embodiment in which the adaptive gap-filling component corresponds to adaptive self-expanding foam. Similar to the embodiments illustrated in FIGS. 5 and 6, the foam may exhibit some delayed solidification properties. More particularly, the foam may contain some glue-type material that may originally be more fluid-like during component installation (i.e., into the gap space). Once the component expands to appropriately fill the gap space, the component may thereafter harden and solidify.

Figure 8A:
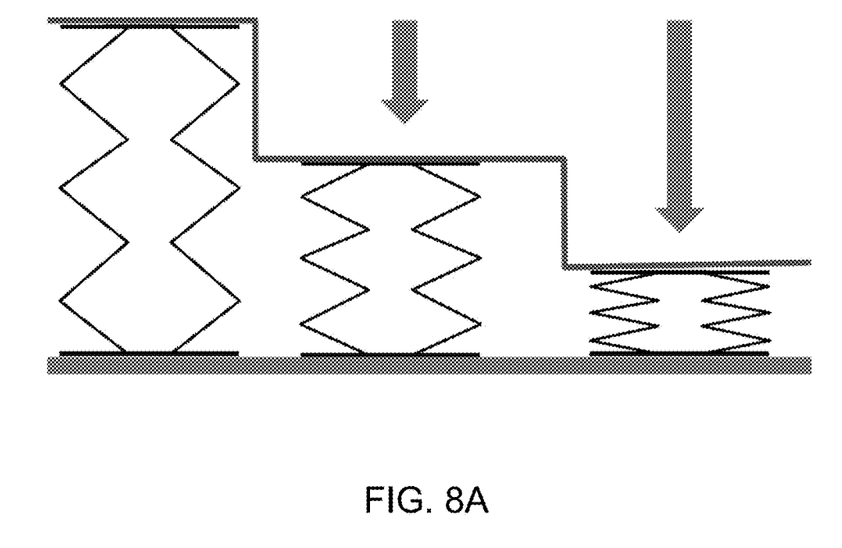
Figure 8B:
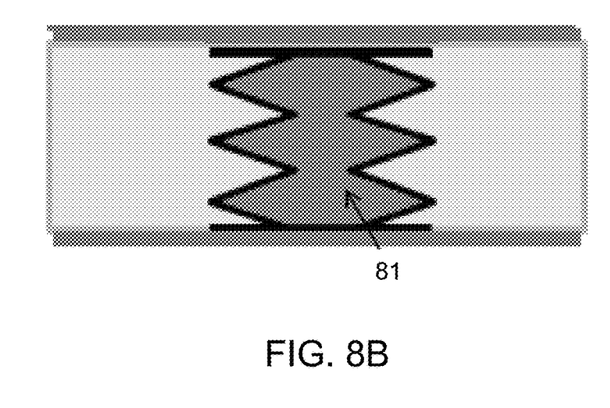

FIG. 8(A-B) illustrates an embodiment in which the adaptive gap-filling component corresponds to a corrugated/accordion-shaped adjustable pipe. Similar to some of the foregoing embodiments, this corrugated component may be adjustable to a desired gap size during installation. More particularly, as shown in FIG. 8A, a force may be applied to the component that allows it to be appropriately sized to a particular gap. In an embodiment, an inner portion 81 of the component may contain a pre-mixed gel, as shown in FIG. 8B, that contains at least five components (i.e., polyols, sulfactants, catalyst, blowing agents, and fire retardents). The implementation of the sizing force may initiate a chemical reaction in the pre-mixed gel which solidifies the component in place once the desired size is achieved.

It is important to note that although the foregoing implementations of the adaptive gap-filling component are described with reference to a battery pack, these descriptions are not limiting. More particularly, the foregoing concepts may be utilized in any application that requires sensors to detect swelling and/or movement of a device component.

The various embodiments described herein thus represent a technical improvement to conventional techniques for detecting battery swelling. More particularly, embodiments of the foregoing provide an adaptive gap-filling component that may be positioned in a gap located between a battery and a system wall that surrounds the battery. The implementation of this component may allow a pressure sensor located at a surface of the battery to more accurately and quickly detect a swelling event.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
    a device component; and
    at least one adaptive gap-filling component situated in a gap between a surface lining of the device component and an inner wall of the electronic device that at least partially surrounds the device component;
    wherein the at least one adaptive gap-filling component comprises a pressure sensor and a mechanical arm;
    wherein the mechanical arm is adjustable to span the gap between the surface lining of the device component and the inner wall of the electronic device;
    wherein the pressure sensor detects turning of the mechanical arm in response to swelling of the device component and wherein a length of the mechanical arm is fixed.

2. The electronic device of claim 1, wherein a length of the at least one adaptive gap-filling component is configured to be adjusted responsive to swelling of the device component.

3. The electronic device of claim 2, wherein the pressure sensor is configured to communicate data associated with the swelling to the electronic device.

4. The electronic device of claim 3, wherein the electronic device further comprises:
    a processor;
    a memory device that stores instructions executable by the processor to:
    utilize the data to perform a function selected from the group consisting of: a user-notification function, a data recordation function, and a dynamic shutoff function.

5. The electronic device of claim 1, wherein the pressure sensor in the at least one adaptive gap-filling component is an adaptive spring piezoresistive sensor.

6. A method, comprising:
    detecting, using a pressure sensor integrated into at least one adaptive gap-filling, a swelling event associated with a device component housed within an electronic device, wherein the at least one gap-filling component further comprises a mechanical arm and is situated in a gap between a surface lining of the device component and an inner wall of the electronic device that at least partially surrounds the device component;

wherein the detecting comprises identifying a turning of the mechanical arm;

wherein the mechanical arm is adjustable to span the gap between the surface lining of the device component and the inner wall of the electronic device;

wherein a length of the mechanical arm is fixed.

7. The method of claim 6, wherein a length of the at least one adaptive gap-filling component is configured to be adjusted responsive to swelling of the device component.

8. The method of claim 7, wherein the pressure sensor is configured to communicate data associated with the swelling to the electronic device.

9. The method of claim 8, further comprising utilizing the data to perform a function selected from the group consisting of: a user-notification function, a data recordation function, and a dynamic shutoff function.

10. The method of claim 1, wherein the pressure sensor in the at least one adaptive gap-filling component is an adaptive spring piezoresistive sensor.

11. A method, comprising:

auto-zeroing a pressure sensor integrated into at least one adaptive gap-filling component, wherein the auto-zeroing comprises:

introducing the at least one adaptive gap-filling component into a gap between a surface lining of a device component housed within an electronic device and an inner wall of the electronic device that at least partially surrounds the device component;

wherein the at least one adaptive gap-filling component comprises a pressure sensor and a mechanical arm;

wherein the mechanical arm is adjustable to span the gap between the surface lining of the device component and the inner wall of the electronic device;

wherein the pressure sensor detects turning of the mechanical arm in response to swelling of the device component and wherein a length of the mechanical arm is fixed.

* * * * *